INVENTOR.
Wilson Greatbatch
BY
Christel & Bean
ATTORNEYS.

United States Patent Office 3,723,183
Patented Mar. 27, 1973

3,723,183
LITHIUM BATTERY ENCLOSURE
Wilson Greatbatch, Clarence, N.Y., assignor to Wilson
Greatbatch Ltd., Clarence, N.Y.
Filed Feb. 4, 1971, Ser. No. 112,621
Int. Cl. H01m 1/02
U.S. Cl. 136—83 R
10 Claims

ABSTRACT OF THE DISCLOSURE

A lithium-iodine battery comprising an anode of lithium metal completely enclosing a cathode of iodide material in which cathode there is positioned a current collecting element at or near the center thereof. The anode enclosure is completed by a substantially planar member of lithium metal precision fitted into the open end of the hollow member and bonded thereto. The anode enclosure, in turn, is located within a moisture-proof, sealing housing.

BACKGROUND OF THE INVENTION

Figure 1:
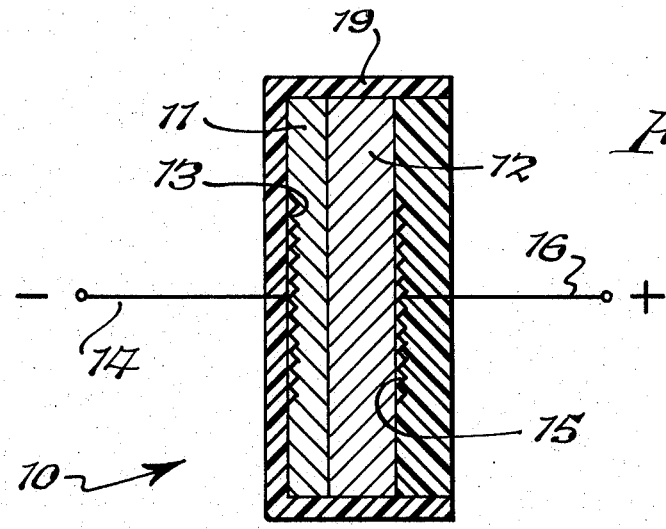

The present invention relates to the conversion of chemical energy to electrical energy and, more particularly, to a new and improved enclosure for electro-chemical cells.

One area of use of the present invention is in providing electrical power safely to inaccessible devices in the human environment, for example to an implantable cardiac pacemaker. Various batteries for implantable cardiac pacemakers have been proposed, but heretofore all have certain limitations. For example, the Rubin mercury-zinc cell has a desirable battery capacity and milliampere-hour rating, but it often is subject to premature failure usually resulting from the corrosive nature of the electrolyte. In addition, the mercury cell operates at relatively high pressures, venting hydrogen gas and occasionally sodium hydroxide to the patient's body.

Recently a lithium-iodine battery has been proposed which advantageously has an open circuit voltage about twice that of the mercury cell and which does not generate gas during operation. A problem arises, however, from the viscous nature of the iodide in that it tends to flow within the battery and form a short circuit path between anode and cathode.

SUMMARY OF THE INVENTION

It is, therefore, an object of this invention to provide an enclosure for a battery of the type wherein one of the battery electrodes is a viscous substance, which enclosure prevents that substance from flowing and forming a short-circuit path in the battery.

It is a further object of this invention to provide an enclosure for a battery for use with implantable prosthetics' which enclosure can be hermetically sealed against body moisture both in the liquid and vapor phase.

It is a particular object of this invention to provide an enclosure for a lithium-iodine battery whereby the iodide cathode is mechanically constrained from leaking to the lithium anode and from creating a short circuit to the anode current collector.

It is a further object of this invention to provide such an enclosure for a lithium-iodine battery which permits a doubling of the anode surface area thereby decreasing the cell impedance by about a factor of four.

The present invention provides a lithium-iodine battery construction and enclosure including a cathode of iodide material and an anode of lithum metal completely enclosing the cathode. Corresponding battery output terminals are connected to the anode and to a current collecting element within the cathode. A moisture proof, sealed housing surrounds and encloses the lithium anode. The structural relationship between anode and cathode together with the manner in which the current collecting element is positioned within the cathode increases internal battery current and decreasen cell impedance.

The foregoing and additional advantages and characterizing features of the present invention will become clearly apparent upon a reading of the ensuing detailed description together with the including drawing wherein:

BRIEF DESCRIPTION OF THE DRAWING FIGURES

Figure 2:
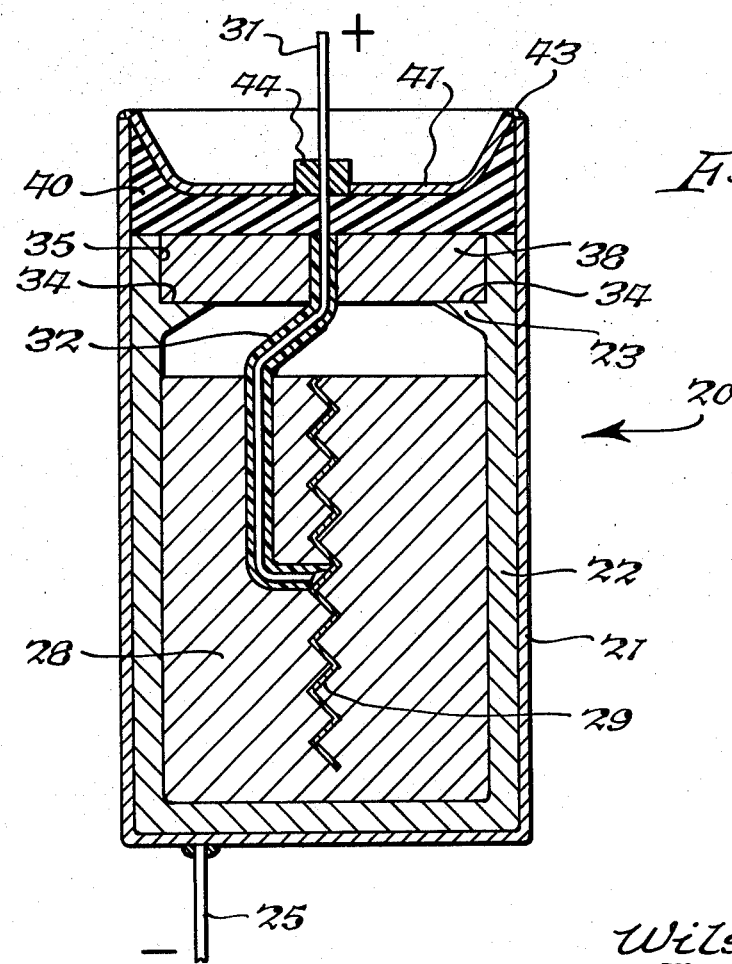

FIG. 1 is a sectional view, partly schematic, illustrating a prior art lithium-iodine battery construction and enclosure; and FIG. 2 is a sectional view of a lithium-iodine battery construction according to the present invention.

DETAILED DESCRIPTION OF THE ILLUSTRATED EMBODIMENT

FIG. 1 is a sectional, partly schematic diagram illustrating a prior art lithium-iodine battery construction and enclosure. The battery 10 comprises an anode in the form of a slab of lithium 11 pressed against or firmly contacting a cathode 12 comprising an iodine-containing compound. The iodide is selected for cathode 12 so that the most conductive lithium salt, LiI, will be the electrolyte formed on discharge. Battery 10 further comprises an anode current collector 13 in the form of a screen or expanded metal element which is embedded in the lithium anode 11. A lead 14 connects current collector 13 to an external battery terminal on which a negative electrical potential is made available. Similarly, a cathode current collector 15 in the form of a screen or expanded metal element is applied to the iodide cathode 12, and a lead 16 connects current collector 15 to an external battery terminal on which a positive electrical potential is made available. As shown in FIG. 1, a typical prior art enclosure for battery 10 comprises a container 19 of plastic material in which the cell is encapsulated.

Briefly, the operation of battery 10 begins with the formation of a lithium iodide electrolyte when the anode 11 and cathode 12 are placed in contact. The transfer of iodine ions from cathode 12 to anode 11 gives rise to a flow of electrical current in an external circuit connected to battery 10 through lead 14, 16. For a more detailed description of the construction and operation of a lithium iodine battery such as that shown at 10 reference may be made to the following publication: Schneider et al., "A New High Energy Density Solid Electrolyte Cell with a Lithium Anode," Proceedings of the U.S. Army Signal Corps. Power Sources Conference, Atlantic City, 1970.

A lithium-iodine battery such as that shown at 10 advantageously has no corrosive electrolyte and therefore has a relatively long life. During the chemical operation thereof, no gas is liberated and no side reaction is known to occur. The battery 10 has a relatively larger theoretical energy density than comparable prior batteries and an open circuit voltage of about 2.8 volts. The relatively longer life, higher energy density and open circuit voltage in relation to comparable prior art batteries render battery 10 especially suitable for operating an implanted artificial cardiac pacemaker. In addition, the fact that battery 10 produces no known side reactions and liberates no gas means that the pacemaker enclosure can be welded shut in a true hermetic seal excluding all body moisture and water vapor.

A lithium-iodine battery construction such as that shown at 10 however, is not completely devoid of operational problems. The iodide comprising cathode 12 is a viscous substance having a consistency similar to that of warm asphalt. With prior art enclosures like that shown at 19, there is a tendency for the iodide material to flow around the end of the slab and form a short circuit path to current collector 13 on anode 11. Various solutions have been proposed such as potting the surface of anode 11 containing collector 13 in polyester, supporting the polyester enclosure within a stainless steel can and with epoxy poured in all voids, and placing the anode 11 and cathode 12 into an epoxy box or container. These various proposals, however, provide only partial cures for the problem.

Referring now to FIG. 2, there is shown a lithium-iodine battery 20 having a construction and enclosure according to the present invention. The battery enclosure comprises a housing or container 21, preferably in the form of a stainless steel one piece container closed at one end and opened at the other. A layer 22 of metallic lithium is included within container 21 in the form of a linear for the inner surface of container 21. Layer 22 is either pressed or bonded onto the inner surface of the steel container 21. For example, the lithium liner 22 could be pressed against container 21 by forcing a hard steel mandrel into the center of the lithium liner 22 previously placed within container 21. As the mandrel is forced in, the lithium is compressed into a relatively thin wall and pressure formed against the inner surface of stainless steel container 21. Alternatively, a relatively thin lithium liner can be bonded to the stainless steel container 21. A process for obtaining a true molecular bond between lithium and a substrate metal such as stainless steel has been developed by the Foote Metal Companyl of Philadelphia, Pa. Lithium liner 22 extends over the entire inner surface of the closed end of container 21 and along a major portion of the length thereof. In addition, a shoulder 23 is formed in liner 22 near the open end of container 21 as will be described in detail presently. Lithium liner 22 function as the anode of battery 20, and an electrical lead 25 connects anode 22 with an external battery terminal on which a negative potential is made available when battery 20 is in operation.

The battery construction according to the present invention further comprises a cathode 28 body of a suitable iodine-containing material. The iodide for cathode 28, as with the iodide of cathode 12 shown in FIG. 1, is selected so that the most conductive lithium salt, LiI, is the electrolyte formed. A current collector 29 is positioned within cathode 28 at or near the center thereof. In the present illustration, cathode current collector 29 is in the form of an expanded or corrugated metal element, but alternatively can comparise a metal screen. In either case, the metal selected is of the non-corrosive variety.

Cathode 28 and current collector 29 can be assembled in battery 20 in the following manner. Prior to formation of shoulder 23 on lithium layer 22, a sandwiched arrangement of metal collector 29 between two slabs of iodide material comprising cathode 28 would be inserted into the open end of container 21 and layer 22. A mandrel would be employed to press the arrangement down or lengthwise along container 21. This insures a close pressure bond between anode 22 and cathode 28. As a result, anode 22 embraces cathode 28 over a major portion of the outer surface of cathode 28. Electrical connection is made to cathode collector 29 by a lead 31 welded at one end thereof to collector 29 at a suitable location thereon, preferably deep within cathode 28, and connected at the other end to an external battery terminal on which a positive potential is made available when battery 20 is in operation. Lead 31 is contained within a tubing 32 of electrcally insulating materal which also is impervious to iodine and lithium. For example, tubing 32 can be of Teflon, glass, epoxy or polyester material. In addition tube 32 is sealed off at the end contacting the point of connection of lead 31 to current collector 29. Lead 31 can, of course, be connected to current collector 29 either before or after assembly of cathode 28 within layer 22.

Shoulder 23 is formed in a manner providing a smooth surface 34 facing toward the open end of the assembly and disposed in a plane substantially perpendicular to the longitudinal center line of container 21. In any event, surface 34 is disposed generally at a right angle with respect to the adjacent inner surface 35 of layer 22. As a result, shoulder 23 provides a precision fit with a cap member 38 of lithium which is generally planar, having a peripheral shape or configuration conforming to that of surface 35. The precise disposition and orientation of the adjacent surfaces 34, 35 can be formed conveniently and accurately by forcing a mandrel of the appropriate size into the open end of the assembly thereby forming the seat defined by surfaces 34 and 35 in layer 22 in a manner similar to die forging.

Cap or closure member 38 is provided with an aperture at or near the center thereof to snugly receive tubing 32 and lead 31 covered thereby. A precision force fit is provided between member 38 and the surfaces 34, 35 and if these contacting surfaces are clean there results a self welding condition between layer 22 and member 38.

The enclosure according to the present invention is completed by a seal of epoxy or similar material 40 which is formed over cap member 38 and the adjacent end surface of layer 22, and by a lid member 41 in the form of a generally cup-shaped member of stainless steel. The peripheral edge of lid 41 is sealed to the adjacent end surface or edge of container 21 by an edge or peripheral weld 43 which is accomplished by known heliarc or needlearc plasma welding techniques. Container 21 and lid 41, accordingly, comprise an hermetically sealed housing for battery 20. A member 44 of electrically insulating material separates lead 31 from lid 41 and is hermetically sealed in the assembly. As a result, a true hermetic seal is provided between the metal container 21 and lid 41. While an hermetic seal is contemplated, it is essential that the seal at least be moisture-proof. In this connection, it should be noted that a true hermetic seal is possible with metal, glass or ceramic materials but not with known epoxies or other plastics.

In operation, a lithium iodide electrolyte begins to form as soon as anode 22 and cathode 28 are assembled in a close fitting relationship, as shown in FIG. 2. In particular, upon the formation of a close pressure bond between anode 22 and cathode 28, a monomolecular layer of lithium iodide electrolyte spontaneously forms. The layer builds up in thickness as battery 20 is drained. The battery 20 has an open circuit voltage of about 2.8 volts measured between leads 25 and 31.

The battery enclosure according to the present invention advantageously prevents the iodide cathode 28, which during operation is of a viscous nature, from in any way leaking to provide a short circuit path in battery 20. Cathode 28 is completely surrounded by the lithium anode comprising liner 22 and member 38 thus constraining iodide migration. In this connection, member 38 and liner 22 are self welded to each other by virtue of the precision force fit between and around the clean sufaces 34, 35 of liner 22 and the clean peripheral and under surface of member 38.

In a rectangular version of the battery construction according to the present invention, the cathode current collector 29 is located at or near the middle or center of cathode 28. Collector 29 is disposed in cathode 28 so that current flows in a direction perpendicular to the face of collector 29 and in two directions, rather than in just one direction as in the battery of FIG. 1. In addition, the operative surface of anode 22 is over twice that of the operative anode surface in the battery of FIG. 1. As a result, the cell impedance is decreased by a factor of four, i.e. a factor of two contributed by reduction of cathode thickness and a factor of two contributed by increase of anode area.

The lithium iodine battery can be used advantageously as an electrical power source for an artificial cardiac pacemaker. The open circuit voltage of 2.8 volts is more than twice that delivered by prior art batteries. This, in turn, enables the pacemaker pulse generator circuit to be operated from a signal cell in a much more reliable manner than heretofore possible. The fact that no gas is generated during the operation of the battery allows it to be welded shut or enclosed in a true hermetic seal. In the battery 20 construction according to the present invention, an enclosure is provided in which lithium anode 22 is pressure formed against or bonded to the inner surface of a stainless steel container 21 as an anode liner in such a manner that the iodide cathode 28 can be enclosed completely in the lithium liner and closure member 38. The entire assembly is then encased in a stainless steel container 21 and cap 41 and welded shut in a true hermetic seal. As a result there is provided a battery enclosure which can be hermetically sealed against body moisture both in the liquid and vapor phase for advantageous use with implantable cardiac pacemakers.

It is therefore apparent that the present invention accomplishes its intended objects. While a single specific embodiment has been described in detail this has been done by way of illustration without thought of limitation.

I claim:

1. A device for converting chemical energy to electrical energy comprising:
   (a) a cathode of iodide material;
   (b) a current collecting element formed from metal and positioned within said cathode;
   (c) an anode of lithium metal completely enclosing said cathode, said anode contacting said cathode over a major portion of the outer surface of said cathode whereby a layer of lithium iodide electrolyte is formed;
   (d) means for connecting said current collecting element to an output terminal at which an electrical potential is provided by operation of said device;
   (e) means for connecting said anode to another output terminal at which an opposite polarity electrical potential is provided by operation of said device; and
   (f) a moisture-proof sealed housing surrounding and enclosing said lithium anode.

2. A device for converting chemical energy to electrical energy comprising:
   (a) a cathode of iodide material;
   (b) a current collecting element formed from metal and positioned within said cathode;
   (c) an anode of lithium metal completely enclosing said cathode, said anode contacting said cathode over a major portion of the outer surface of said cathode whereby a layer of lithium iodide electrolyte is formed, said anode comprising a hollow member closed at one end and open at the other and formed with a shoulder near the open end thereof and a substantially planar closure member of lithium metal fitted into the open end of said hollow member and in contact with said shoulder whereby said members become bonded together to seal the interior of said hollow member;
   (d) means for connecting said current collecting element to an output terminal at which an electrical potential is provided by operation of said device;
   (e) means for connecting said anode to another output terminal at which an opposite polarity electrical potential is provided by operation of said device; and
   (f) a moisture-proof sealed housing surrounding and enclosing said lithium anode.

3. A device according to claim 2 wherein said shoulder formed in said hollow member includes a surface facing the open end of said member and disposed in a plane substantially perpendicular to the axis of said hollow member.

4. A device according to claim 2 wherein said shoulder formed in said hollow member includes a surface facing the open end of said hollow member and disposed at about a right angle with respect to the adjacent inner wall surface of said hollow member.

5. A device according to claim 1 wherein said current collecting element is located generally centrally of said cathode and disposed in a plane substantially perpendicular to the direction of flow of electrical current in said cathode.

6. A device according to claim 1 wherein a solid lithium iodide electrolyte is formed between said anode and said cathode during operation of said device.

7. A device according to claim 2 wherein said current collecting element is located generally centrally within said cathode and has a planar operative surface disposed substantially perpendicular to the direction of flow of electrical current in said cathode.

8. A device according to claim 1 wherein said means connecting said current collecting element comprises a lead surrounded by a sleeve of electrically insulating material, said lead and said sleeve extending into said cathode and said lead being connected to said current collecting element at a point thereon within said cathode.

9. A device according to claim 1 wherein said anode comprises a hollow member of lithium metal closed at one end and open at the other and a closure member of lithium metal bonded to said hollow member in a manner sealing the interior of said hollow member.

10. A device for converting chemical energy to electrical energy comprising:
   (a) a cathode of iodide material;
   (b) a current collecting element formed from metal and positioned within said cathode;
   (c) an anode of lithium metal completely enclosing said cathode, said anode contacting said cathode over a major portion of the outer surface of said cathode whereby a layer of lithium iodide electrolyte is formed;
   (d) means for connecting said current collecting element to an output terminal at which an electrical potential is provided by operation of said device;
   (e) means for connecting said anode to another output terminal at which an opposite polarity electrical potential is provided by operation of said device; and
   (f) a moisture-proof sealed housing surrounding and enclosing said lithium anode, said housing comprising a hollow metal container closed at one end and open at the other, said container contacting said lithium anode in a snug-fitting relationship and the open end of said container extending beyond said anode and a seal of epoxy material formed in the open end of said container over said anode whereby said anode is completely enclosed by said container and said seal and a lid member positioned at the open end of said hollow container and sealed along the periphery thereof to the peripheral edge defining the open end of said container.

References Cited

UNITED STATES PATENTS

| | | | |
|---|---|---|---|
| 2,953,620 | 9/1960 | Smyth et al. | 136—83 |
| 3,455,742 | 7/1969 | Rao | 136—83 |
| 3,513,027 | 3/1969 | Liang et al. | 136—83 |
| 3,502,508 | 3/1970 | Honer | 136—100 |
| 3,463,670 | 8/1969 | Rao et al. | 136—83 |

ANTHONY SKAPARS, Primary Examiner